April 22, 1969     E. GARBERS ET AL     3,439,778
DEFORMABLE RAILWAY WHEEL BRAKE
Filed Oct. 24, 1966
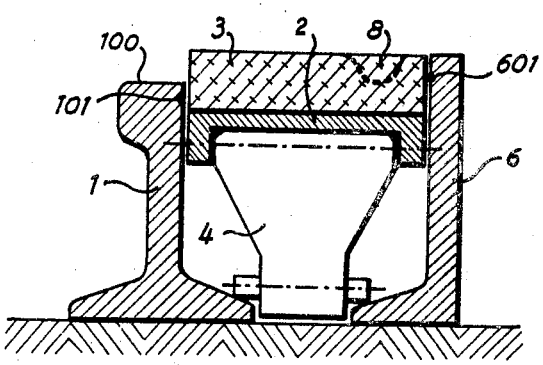
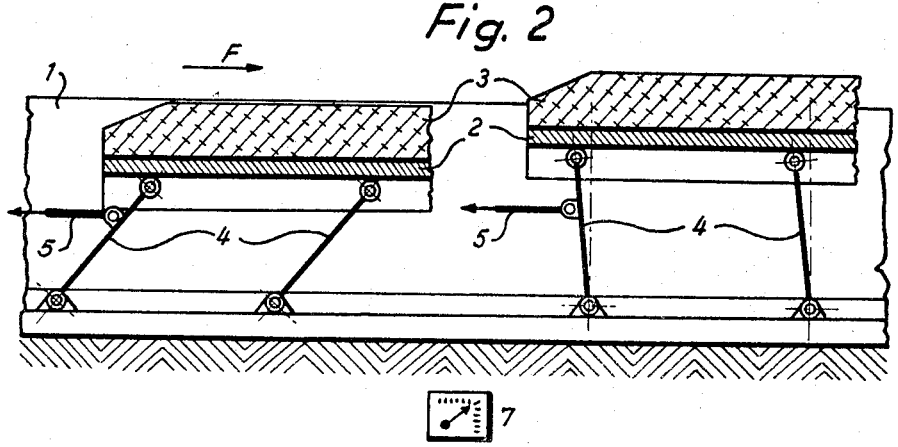
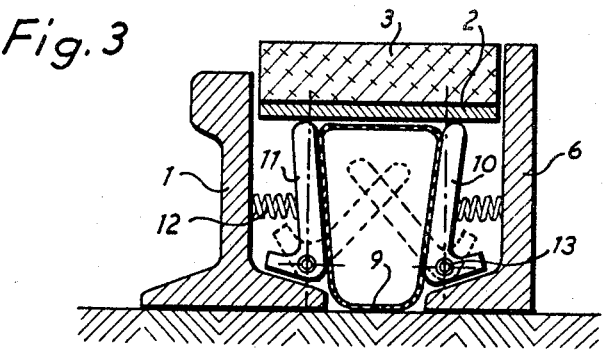
INVENTORS
Ernst Garbers
Theodor Klotzek
Erwin Spingies
BY
ATTYS.

United States Patent Office 3,439,778
Patented Apr. 22, 1969

3,439,778
DEFORMABLE RAILWAY WHEEL BRAKE
Ernst Garbers, 10 Dammannweg 52, Theodore Klotzek, 38 Reeseberg 90, and Erwin Spingies, 31 Bullskamp 72, all of Hamburg, Germany
Filed Oct. 24, 1966, Ser. No. 588,858
Claims priority, application Germany, Oct. 23, 1965, G 45,015
Int. Cl. B61k 7/02; B60t 8/12
U.S. Cl. 188—62                 12 Claims

ABSTRACT OF THE DISCLOSURE

Stationary rail brake for braking vehicles traveling along a track and particularly shunted railway vehicles in marshalling yards. The braking element is in the form of a deformable material having elastomeric properties and supported to extend along one side of a rail. The support is vertically movable to lift the elastomeric material above the head of the rail and brake rotation of the wheel by the shearing effect of the material on the wheel and by molecular movement of the elastomeric material. A confining rail may be spaced from the railway rail to confine the elastomeric material and restrict the deformation of the material transversely of the direction of travel of the wheel and to confine molecular movement of the material substantially in the direction of travel of the material, to thereby increase the total braking effect. Means operated under control of the speed of the vehicle may be provided to raise and lower the elastomeric material through operation of mechanical or fluid pressure operated means.

---

The known methods and devices for the braking of such vehicles e.g., chocks, drag shoes and track brakes, have considerable disadvantages. Chocks and drag shoes are only suitable for the braking of vehicles moving at a relatively slow speed to a standstill. Drag shoes in railway tracks can of course also be thrown out by special devices before the vehicle is at a standstill, the remaining speed of the vehicle depending on the visual judgment of the drag shoe layer. When drag shoes are used there is always a great risk that the wheels may be braked fast and through slipping on the rails flats will be produced on the running surface, the elimination of these involving considerable expense. Also, flats may cause rail fractures and thus derailment. Track brakes with brake shoes adapted to be pressed laterally against the wheels are very heavy and are very expensive both to produce and also to maintain as a result of considerable wear. All shoe brakes have the disadvantage that the braking forces produced by them are frictional forces which are caused by pressing the shoes laterally against the wheels. These brakes have also the great disadvantage that when operating by persons who are not skilled the wheels can climb up, i.e., no longer run on the rails but on the brake shoes, causing derailment. The latter disadvantage can in fact be avoided in the case of electrodynamic track brakes, the so-called eddy current brakes, but these are very expensive to obtain.

The invention obviates these disadvantages in that the vehicles are braked at the brakes by their wheels rolling over deformable material having elastomeric properties, so-called elastomeric material, which produces the braking effect at the wheel circumference in the direction opposite to the running direction substantially by a molecular movement dependent on the weight and speed of the vehicles in addition to increasing the rolling frictioin.

This braking effect can be adapted to locally varying conditions by using selectively elastic material of varying hardness and/or length in accordance with the weight and speed of the vehicles to be braked, or providing elastic material of different hardness and length in any desired alternation one behind the other, or using elastic material consisting of layers of different hardnesses, or using elastic material with incorporated or applied layers of different material e.g. steel strips or fabrics, or providing the elastic material with at least one hollow chamber which extends over the entire length or a part of such material, or providing the upper side of the elastic material, on which the vehicles travel, with elevations e.g. planes ascending in inclined fashion in the direction of travel and falling away vertically at the end so that the braking effect of the elastic material is increased by repeated lifting of the vehicle, by taking the lifting energy from the kinetic energy, or restricting the deformation of the elastic material transversely to the direction of travel by laterally arranged abutment surfaces, the molecular movement being effected substantially in the direction of travel as a result, and the braking effect being thereby increased.

For economic utilization of the elastic material the total length of the brake can be subdivided into a plurality of elements of equal length which are interchangeable with one another.

By means of the invention, the vehicles can be braked to any desired speed. In the simplest case with vehicles of the same type and involving the same amount of kinetic energy e.g. mine trucks, the elastic material is so constructed that its braking effect is adapted to the kinetic energy which is to be annulled, and the vehicles are braked without additional control of the brake, i.e., automatically, to the desired uniform speed. It is also possible to arrange the elastic material on a stationary support in such an inclined position that the rolling resistances are compensated and only the molecular movement in the elastic material, depend on the weight and speed of the vehicle, produce the necessary braking effects which brake the vehicle automatically to the desired slowing down speed. In all other cases it is expedient to arrange either the upper side of the elastic material or a support for the elastic material to be vertically movable. Then, as soon as the vehicle has reached a desired speed, the braking effect can be discontinued by lowering the upper side or the support. The lifting and lowering of the support can be effected mechanically or hydraulically or pneumatically e.g. by filling and emptying a flexible tube arranged below or beside the support.

Important advantages of the invention are silent braking which does not harm the vehicle, application of braking force directly on the wheel periphery in the direction opposite to the direction of running, automatically weight-dependent braking, i.e., omission of the weighing device which is necessary with shoe brakes, production of braking force without prejudicing the rotary movement of the wheels, and finally low initial cost price and maintenance costs.

One example of embodiment of the invention for the braking of rail vehicles is illustrated in the drawings wherein:

FIG. 1 is a cross section through a mechanically liftable and lowerable braking device on a railway rail;

FIG. 2 is a side view of the braking device shown in FIG. 1, in the inactive state in the left hand portion and in the active state in the right hand portion; and FIG. 3 shows a hydraulically or pneumatically operable device for rendering the braking device active and inactive.

According to FIG. 1 there is provided between the track rail 1 and the guide rail 6 a braking element wherein the elastomeric material 3 is arranged on the movable support 2. To increase the volume, which is a determining factor for the braking effect, of the elastic material which serves as a running surface for the wheel, a part of the rail head of the track rail 1 is removed. The elastic material 3 can also be adapted to the shape of the wheel as indicated in broken lines, by forming a groove 8 for the wheel flange.

As FIG. 2 shows, the braking device is arranged to be brought into action and rendered inactive by lifting and lowering the braking element 2, 3 through the agency of the levers 4 and pull rod 5. Engaging and disengaging the braking device can be controlled automatically by a known speed measuring device 7 in dependence on the speed of the vehicle.

The way in which the braking method operates will be explained hereinafter with reference to FIG. 1. When a vehicle runs on the track rail 1 in the direction indicated by the arrow F and the speed measuring device 7 indicates that the vehicle is at the same speed as or a lower speed than the desired slowing down speed, the brake remains in the disengaged state which is shown in the left hand part of FIG. 2. The vehicle then rolls over the head surface 100 of the track rail 1, i.e., along the normal bearing plane, over and past the brake without being influenced thereby. If, on the other hand, the measuring device 7 detects a higher speed, it automatically has the result that through the agency of the pull rod 5 and the levers 4 the support 2 with the elastic material 3 situated thereon is lifted into the position shown in the right hand part of FIG. 2 and thus the brake is engaged. When a wheel runs over the elastic material, in addition to the greater resistance to rolling presented by this material as compared with the head surface 101, an additional braking effect is produced by the molecular movement in the elastic material, which is dependent on the wheel pressure and the speed of the vehicle. The additional braking effect occurs due to the fact that the wheel sinks into the elastic material in accordance with its pressure, the shearing force of the wheel in the direction of travel forming in the elastic material an undulation which is dependent on the speed and which has an inhibiting opposing action owing to the fulling work which is produced at the same time by the kinetic energy of the vehicle. The braking effect is further increased by the fact that the deformation of the elastic material 3 transversely to the direction of travel is restricted by the surfaces 101 and 601 of the track rail 1 and auxiliary rail 1 which are directed toward the said material. As a result, the molecular movement in the elastic material 3 occurs substantially in the direction of travel.

As soon as the braking effect has achieved the desired slowing down speed, the measuring device 7 automatically has the effect that through the agency of the pull rod 5 and the levers 4 the braking element comprising the support 2 with the elastic material 3 situated thereon, is lowered and thus the brake is disengaged. The vehicle then runs on further along the head surface 100 of the track rail 1 without being influenced further.

The lifting and lowering of the braking element can also be effected in other ways, e.g. by arranging below the support 2 a flexible tube which can be filled and emptied hydraulically. Alternatively, the braking device can be engaged and disengaged by the elastic material itself by appropriate shaping, e.g. by providing hollow chambers which can be filled and emptied.

In FIG. 3 it is assumed that the braking element is subdivided into a plurality of sub-elements of equal length and the lifting and lowering of the sub-elements is effected by filling and emptying the flexible tube 9. When it is filled, the flexible tube 9 presses the levers 10 and 11 which are adapted to rock about the pivot point 13, out of the broken line inoperative position illustrated in the figure into the position shown in full lines, whereby the support 2 with the elastic material 3 is lifted and the springs 12 subjected to preload. When the flexible tube is emptied, the springs 12 subjected to preload press the rockable levers 10 and 11 back into the broken line position of rest, and the sub-elements are lowered again.

If the desired vehicle speed is reached during the braking operation, when the flexible tube 9 is emptied only the sub-elements of the braking element are lowered which are not loaded by a wheel. In the case of loaded sub-elements the force of the preloaded springs 12 is not sufficient to bring the rockable levers 10 and 11 back into the position of the rest. The force of the preloaded springs 12 is only sufficient to lower the sub-element when the wheel has rolled off the sub-element.

With wheels which have a wheel flange it is also possible to make the width of the elastic material 3 so slight that the wheel flanges do not roll thereon, i.e., the material is arranged only in the space between the track rail 1 and approximately the left hand side of the groove 8 in FIG. 1. In the case of brakes with braking elements which can be lifted and lowered the auxiliary rail 6 can then be used not only for supporting the levers 4 (FIGS. 1 and 2) and 10 (FIG. 3) but also as a wheel guide, i.e., for guiding the wheels at the inner side of the wheel flanges.

The method according to the invention can also be used with other wheeled vehicles which run in a predetermined track e.g. in overhead railways and roller tracks with lateral guide bars, and the speed of which is to be reduced by stationary brakes.

We claim:
1. In a rail brake for railway vehicles having wheels and in combination with a rail,
   at least one braking element extending alongside of the rail and including,
   a rigid support having an elastomeric material extending along the topside thereof and providing a surface along which the wheels to be braked roll, and
   means lifting said support to bring the elastomeric material above the top surface of the rail to brake rotation of the wheels by the shearing of the material by the wheels and the molecular movement of the material, and for lowering said support to release the material from the wheels and thereby release the brake.

2. A rail brake in accordance with claim 1,
   wherein means are provided to confine lateral movement of the elastomeric material and restrict the molecular movement of the elastomeric material in the direction of travel of the wheels.

3. A rail brake in accordance with claim 1,
   wherein the elastomeric material consists of layers of material of different hardness.

4. A rail brake in accordance with claim 1,
   wherein a plurality of aligned braking elements are provided to extend along the head of the rail.

5. A rail brake in accordance with claim 1,
   wherein the means lifting the support comprise a plurality of parallel links and power means holding said links in position and raising and lowering said links and support in accordance with the braking effect desired.

6. A rail brake in accordance with claim 1,
   wherein the elastomeric material is formed to conform to the flange of the wheel.

7. A rail brake in accordance with claim 1,
   wherein the means lifting the support to bring the elastomeric material above the top surface of the rail comprises an inflatable tube disposed beneath said support.

8. A rail brake in accordance with claim 7,
   wherein spaced levers engage opposite sides of said flexible tube and form supports for said support and lift said support upon inflation of said tube, and
   wherein spring means retract said levers and distend said tube upon the release of fluid pressure in said tube.

9. A rail brake for railway vehicles in accordance with claim 1, wherein a retainer rail is spaced inwardly of and extends parallel to the rail and above the head of the rail head to a height equal to substantially the limits of the top of the elastomeric material when in a vertically extended position, wherein the support and the elastomeric material are guided for vertical movement between the rail and retainer rail and the elastomeric material on said support is restricted from lateral flow thereby.

10. A rail brake in accordance with claim 9, wherein parallel links disposed between the rail and retainer rail form vertically movable supports for said support and the elastomeric material thereon and wherein a power member having operative connection with at least one of said parallel links serves to move said parallel links to raise and lower said support and the elastomeric material thereon to apply and release the brake.

11. A rail brake in accordance with claim 9, wherein spaced levers are pivoted in the space between said rail and retainer rail for movement about axes extending longitudinally thereof, wherein an inflatable tube is disposed between said levers and has engagement therewith to move said levers into upright supporting positions upon inflation of said tube, and wherein spring means bias said levers in retracted positions upon deflation of said tube to lower said support and the elastomeric material thereon beneath the top surface of the head of the rail.

12. A rail brake in accordance with claim 11, wherein a plurality of aligned supports are guided in a space between the rail and retainer rail and are supported on said levers and are simultaneously lifted upon inflation of said flexible tube.

References Cited

UNITED STATES PATENTS 2,715,369  8/1955  Doehler _____ 188—62 X

FOREIGN PATENTS 628,798  7/1927  France.

DUANE A. REGER, *Primary Examiner.*

U.S. Cl. X.R.

188—180